US012675847B2

(12) United States Patent
Aragon et al.

(10) Patent No.: US 12,675,847 B2
(45) Date of Patent: Jul. 7, 2026

(54) COMPUTER-IMPLEMENTED METHOD FOR OBTAINING A COMBINED IMAGE

(71) Applicant: Identy Inc., Dover, DE (US)

(72) Inventors: Jesus Aragon, Dover, DE (US); Hardik Gupta, Dover, DE (US)

(73) Assignee: Identy Inc., Dover, DE (US)

( * ) Notice: Subject to any disclaimer, the term of this patent is extended or adjusted under 35 U.S.C. 154(b) by 249 days.

(21) Appl. No.: 18/217,396

(22) Filed: Jun. 30, 2023

(65) Prior Publication Data

US 2024/0428370 A1     Dec. 26, 2024

(30) Foreign Application Priority Data

Jun. 20, 2023    (EP) .................................... 23180400

(51) Int. Cl.
*G06K 9/00*          (2022.01)
*G06T 3/00*          (2006.01)
(Continued)

(52) U.S. Cl.
CPC ................. *G06T 5/50* (2013.01); *G06T 3/00* (2013.01); *G06T 3/02* (2024.01); *G06T 3/40* (2013.01);
(Continued)

(58) Field of Classification Search
CPC .... G06T 5/50; G06T 3/00; G06T 3/02; G06T 3/40; G06T 7/0002; G06T 7/60;
(Continued)

(56) References Cited

U.S. PATENT DOCUMENTS

| | | | | |
|---|---|---|---|---|
| 4,933,976 A | * | 6/1990 | Fishbine ............ | G06V 40/1335 |
| | | | | 382/127 |
| 6,094,499 A | * | 7/2000 | Nakajima .......... | G06V 40/1365 |
| | | | | 382/280 |

(Continued)

FOREIGN PATENT DOCUMENTS

| | | | | |
|---|---|---|---|---|
| CA | 3031557 A1 | * | 2/2018 | ............... G06T 7/32 |
| EP | 3336756 A1 | * | 6/2018 | ........... G06V 10/772 |

(Continued)

OTHER PUBLICATIONS

A Mosaic Approach to Touchless Fingerprint Image with Multiple Views, Mohammed Alkhathami et al., ACM, 2014, pp. 1-8 ( Year: 2014).*

(Continued)

*Primary Examiner* — Jayesh A Patel
(74) *Attorney, Agent, or Firm* — Lowenstein Sandler LLP

(57) ABSTRACT

A computer-implemented method for obtaining a combined image from two images, the computer-implemented method comprising: obtaining a first image and a second image of a biometric feature of a user, the biometric feature comprising a plurality of characteristics; identifying, in the first image and in the second image, the characteristics; storing the first and second image and the identified characteristics; for at least some of the identified characteristics in the first image, identifying corresponding identified characteristics in the second image;
deriving a transformation for transforming the at least some of the identified characteristics in the second image into the corresponding identified characteristics in the first image; and modifying at least a portion of the second image using the transformation and obtaining a combined image comprising at least one portion of the first image and the at least one modified portion of the second image.

20 Claims, 3 Drawing Sheets

(51) Int. Cl.

| | | |
|---|---|---|
| *G06T 3/02* | (2024.01) |
| *G06T 3/40* | (2006.01) |
| *G06T 5/50* | (2006.01) |
| *G06T 7/00* | (2017.01) |
| *G06T 7/60* | (2017.01) |
| *G06T 7/73* | (2017.01) |
| *G06V 40/12* | (2022.01) |
| *G06V 40/18* | (2022.01) |

(52) U.S. Cl.
CPC .............. *G06T 7/0002* (2013.01); *G06T 7/60* (2013.01); *G06T 7/74* (2017.01); *G06V 40/1353* (2022.01); *G06V 40/1359* (2022.01); *G06V 40/1371* (2022.01); *G06V 40/193* (2022.01); *G06V 40/197* (2022.01); *G06T 2207/20084* (2013.01); *G06T 2207/20212* (2013.01); *G06T 2207/20221* (2013.01)

(58) Field of Classification Search
CPC ............. G06T 7/74; G06T 2207/20084; G06T 2207/20212; G06T 2207/20221; G06V 40/1353; G06V 40/1359; G06V 40/1371; G06V 40/193; G06V 40/197; G06V 40/1335
See application file for complete search history.

(56) References Cited

U.S. PATENT DOCUMENTS

| | | | | |
|---|---|---|---|---|
| 6,459,804 | B2 * | 10/2002 | Mainguet | G06V 40/1306 |
| | | | | 382/284 |
| 7,587,072 | B2 * | 9/2009 | Russo | G06V 40/1335 |
| | | | | 382/124 |
| 9,684,815 | B2 * | 6/2017 | Walch | G06V 30/142 |
| 2004/0125993 | A1 * | 7/2004 | Zhao | G06V 40/12 |
| | | | | 340/5.53 |
| 2004/0151352 | A1 * | 8/2004 | Nakajima | G06V 40/1365 |
| | | | | 382/124 |
| 2005/0041885 | A1 * | 2/2005 | Russo | G06V 40/1335 |
| | | | | 345/157 |
| 2005/0100200 | A1 * | 5/2005 | Abiko | G06V 40/1335 |
| | | | | 382/124 |
| 2008/0317306 | A1 * | 12/2008 | Hamilton | G06V 40/1335 |
| | | | | 382/128 |
| 2014/0003677 | A1 * | 1/2014 | Han | G06V 40/13 |
| | | | | 382/124 |
| 2016/0379038 | A1 * | 12/2016 | Vural | G06V 10/993 |
| | | | | 382/125 |
| 2018/0032786 | A1 * | 2/2018 | Tieu | G06V 40/13 |
| 2018/0225494 | A1 * | 8/2018 | Rhee | G06V 40/1365 |
| 2023/0419739 | A1 * | 12/2023 | Sammoura | G06V 40/1353 |

FOREIGN PATENT DOCUMENTS

| | | | | | |
|---|---|---|---|---|---|
| JP | | 3597148 | B2 * | 12/2004 | ........ G06V 40/1347 |
| WO | WO-03010707 | A1 * | 2/2003 | ........ G06V 40/1335 |
| WO | WO-2005034021 | A1 * | 4/2005 | ........ G06V 40/1335 |
| WO | WO-2008155550 | A2 * | 12/2008 | ........ G06V 40/1335 |
| WO | WO-2011022186 | A1 * | 2/2011 | ........ G06V 40/1365 |
| WO | WO-2016044804 | A1 * | 3/2016 | ........ G06V 40/1376 |

OTHER PUBLICATIONS

Extended European Search Report Serial No. EP 23 20 0923 , dated Feb. 28, 2024, 11 pages.

Zhan Xiaosi et al: "Fingerprint Ridge Distance Estimation: Algorithms and the Performance", Jan. 5, 2006 (Jan. 5, 2006), SAT 2015 18th International Conference, Austin, TX, USA, Sep. 24-27, 2015; [Lecture Notes in Computer Science; Lect.Notes Computer], Springer, Berlin, Heidelberg, pp. 294-301, XP047466557, ISBN: 978-3-540-74549-5.

Extended European Search Report Serial No. EP 23 18 0400, dated Nov. 23, 2023, 8 pages.

Mohammed Alkhathami et al., "A Mosaic Approach to Touchless Fingerprint Image with Multiple Views", ICDSC '14: Proceedings of the International Conference on Distributed Smart Cameras, Nov. 2014, Article No. 22, pp. 1-8, https://doi.org/10.1145/2659021. 2659065.

* cited by examiner

200

300

COMPUTER-IMPLEMENTED METHOD FOR OBTAINING A COMBINED IMAGE

RELATED APPLICATIONS

This Application claims the benefit under 35 U.S.C. § 119 (a) of EP patent application 23180400.6, filed Jun. 20, 2023, which is incorporated by reference herein.

TECHNICAL FIELD

The present disclosure relates to a computer-implemented method for obtaining a combined image from two images and a device on which to implement the method.

BACKGROUND

Combining images showing, for example, different portions of an object like the face or finger of a user is a commonly known task. For aligning different portions of an object from different images, the "RANSAC algorithm" was recently developed as explained in "A Mosaic Approach to Touchless Fingerprint Image with Multiple Views" by Alkhathami et al. While the method described in this document may generally be applicable for aligning parts of objects, some objects, like fingerprints used for identification have high requirements with respect to the accuracy of alignment of different portions of different images.

There consequently is a constant need for improving the obtaining of combined images, particularly in the context of identifying users using several images from the same biometric feature of the user, like his or her fingerprint or his or her eye.

BRIEF DESCRIPTION OF THE DRAWINGS

Embodiments of the present disclosure are illustrated by way of example, and not by way of limitation, in the figures of the accompanying drawings.

DETAILED DESCRIPTION

Figure 1:
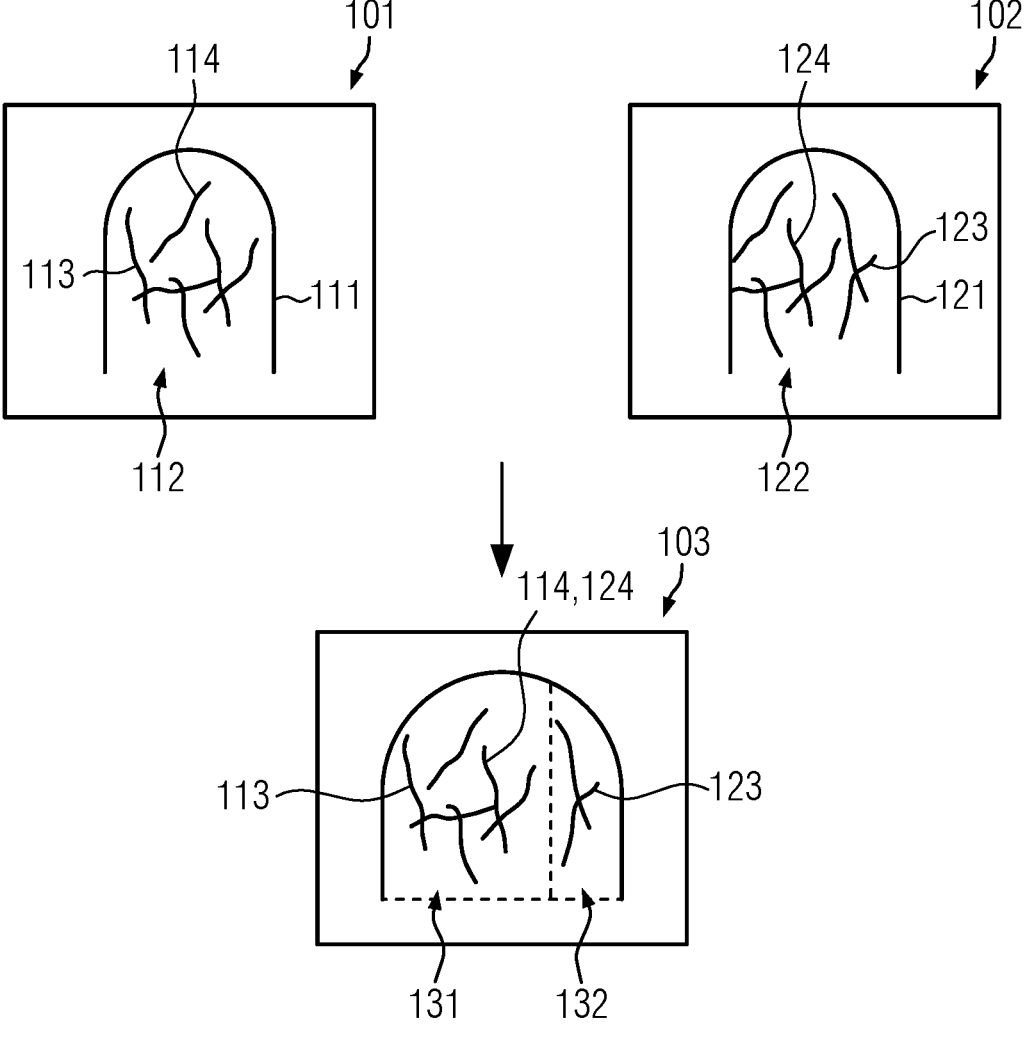
FIG. 1 shows a schematic depiction of images taken and a combined image, according to one embodiment of the present disclosure.

Embodiments of the present disclosure improve the accuracy with which combined images are obtained from two images.

Aspects of the present disclosure describe a computer-implemented method for obtaining a combined image from two images, and a device comprising at least one processor and a memory comprising computer executable instructions on which to implement the method.

The computer-implemented method for obtaining a combined image from two images, comprises the following steps: obtaining a first image and a second image of a biometric feature of a user, the biometric feature comprising a plurality of characteristics; identifying, in the first image and in the second image, the plurality of characteristics;

storing the first and second image and the identified characteristics; for at least some of the identified characteristics in the first image, identifying corresponding identified characteristics in the second image; deriving a transformation for transforming the at least some of the identified characteristics in the second image into the corresponding identified characteristics in the first image; modifying at least a portion of the second image using the transformation and obtaining a combined image comprising at least one portion of the first image and the at least one modified portion of the second image.

Obtaining the first and second image can comprise that the images are taken by the device that carries out the computer-implemented method, for example, a smart phone or other mobile device that itself comprises an optical sensor, like a camera. Alternatively, the obtaining of the first image and the second image may comprise the computer system carrying out the method to be provided with the first image and the second image, for example via a data transfer (wired or wireless) from a device comprising an optical sensor that takes the first and the second image and the device then sends the first image and the second image to the respective computing system. In this respect, the computing system may be an identifying system for identifying a user based on the first and the second image, for example, for allowing access to user restricted data, like, for example, to a banking account.

The transformation, according to the embodiments of present disclosure, may be a mathematical expression like a two-dimensional transformation matrix, comprising entries that denote a transformation for transforming the identified characteristics (their associated pixels in the images, respectively) from the arrangement in which they are presented in the second image so as to match their representation as they would look when taken under conditions corresponding to those at which the first image was taken. For example, the first image may be taken from a different point of view than the second image with respect to how the biometric feature is arranged relative to the optical sensor when taking the first image and the second image. The transformation thus allows for transforming at least a portion of the second image (the respective pixels) to how this portion would look like when being imaged under the circumstances of the first image.

This can comprise at least one of increasing or decreasing, rotating or moving portions of the second image when transforming it, or arbitrary combinations of these transformations. Thereby, pixels may be added or deleted or moved or portions of the image may be rotated when applying the transformation to the second image.

The combined image, according to the embodiments of present disclosure, is thus made up from portions of the first image and transformed portions originating from the second image. Thereby, an image of the biometric feature (for example, the fingerprint) is obtained that most closely corresponds to an image of the whole biometric feature being taken under the circumstances (for example, relative angle between the biometric feature and the optical sensor) as in the first image, or when taking the first image, respectively.

It is noted that the present disclosure is not limited to using exactly two images but more than two images, for example three images, four images or even 10 or 20 images may be used. In this respect, one of a plurality of images (more than two, at least three for example) may be used as a central image or base image and the transformation of each of the other images may be determined in view of or compared to this central image. The combined image may then be obtained in line with the above and below described embodiments using at least portions of at least three images of the plurality of images (or portions of each image of the plurality of images).

With this method, it is possible to use more characteristics of the biometric feature for identifying a user, which increases the accuracy with which the user can be identified compared to images of only small portions of the biometric feature being taken and used for identification. For example, more images can be used for identifying the user.

In one embodiment, obtaining the first and the second image comprises binarizing a first original image and a second original image. With this, a contrast can be increased which improves the identification accuracy.

It can further be provided that deriving the transformation comprises, obtaining for at least two disjointed pairs of an identified characteristic in the first image and the corresponding identified characteristic in the second image, a sub-transformation and obtaining, from at least two sub-transformations, the transformation.

The sub-transformation comprises the transformation that transforms the corresponding identified characteristics in the second image to the conditions at which the first image was taken. These may not be equal for all these disjointed pairs of identified characteristics, for the method may therefore comprise deriving an average transformation that most closely, and therefore reliably, results in a transformation of all portions of the second image to the circumstances under which the first image was obtained in a reliable manner.

In one embodiment, obtaining, from the at least two sub-transformations, the transformation, comprises calculating a global transformation from the at least two sub-transformations and determining, for at least one sub-transformation, a deviation from the global transformation and discarding or maintaining the at least one sub-transformation depending on the deviation.

The deviation may be an absolute or relative deviation of at least one value of the sub-transformation compared to the corresponding value in the global transformation. Discarding or maintaining at least one sub-transformation depending on the deviation may, for example, comprise discarding those sub-transformations that exhibit a deviation from the global transformation that is larger than a threshold value (either a relative or an absolute value).

The computer-implemented method can comprise recalculating the global transformation using only maintained sub-transformations and using the recalculated global transformation as transformation. With this, the accuracy of the global transformation for obtaining the transformation is increased.

It can be provided that the transformation is indicative of an amount of scaling and/or moving and/or rotating that is necessary to transform a portion of the second image.

The transformation can thus be or can be represented as, for example, a two-dimensional matrix with entries exhibiting the transformation necessary for transforming a pixel or portion from the second image to the circumstances under which the first image was taken.

In one embodiment, obtaining the combined image comprises modifying each portion of the second image using the transformation and, for at least one portion existing in the first image and the modified second image, using the portion of the first image. While the transformation may be comparably reliable, the accuracy of the portion existing in the first image is still higher. Using, as default, portions of the first image can thus increase the accuracy with which a user may be identified or the combined image is produced.

In one embodiment, deriving the transformation further comprises obtaining, from the first and the second image, an orientation map and using the orientation map for deriving the transformation.

With this, a second mode independent from determining the transformation based on corresponding characteristics in the first and second image is used for deriving the transformation. This may increase the reliability of the transformation and thereby the accuracy with which portions of the second image are mapped to the first image.

It can be provided that obtaining the orientation map comprises, for at least one characteristic in the first image and a corresponding characteristic in the second image, identifying a pixel in the at least one characteristic in the first image and a corresponding pixel in the corresponding characteristic in the second image for which an orientation similarity is higher than the orientation similarity for at least one other pixel in the at least one characteristic in the first image and a corresponding other pixel in the corresponding characteristic in the second image and providing orientation information on the pixel in the orientation map.

The orientation similarity determines how closely the orientation of the pixel in the first image matches the orientation of the pixel in the second image, i.e., how closely the conditions under which this particular pixel (or the image information it encodes) was taken (for example, its relative arrangement compared to the optical sensor) is to the conditions of the corresponding pixel (or the image information it encodes) in the first image. This allows for reliably determining the transformation and can particularly be used to fine tune the transformation previously determined with one of the above or below described methods. By additionally using orientation similarities and/or the orientation map, spurious results or artifacts otherwise obtained when determining the transformation can be removed or at least reduced. The transformation may, for example, be calculated using a mean value of the orientation derived using a pixel in the at least one characteristic in the first image and the corresponding pixel in the corresponding characteristic in the second image and the transformation obtained when transforming the at least some of the identified characteristics in the first image into the corresponding identified characteristics in the second image. The accuracy of the transformation is thereby increased.

In one embodiment, the orientation similarity of the pixel and the corresponding pixel is the highest orientation similarity of all pixels in the at least one characteristic and the corresponding characteristic. With this, the accuracy of the obtained transformation is further increased.

Deriving the transformation can comprise using a neural network to determine at least one value characterizing the transformation. The neural network may be a trained neural network that is trained using a plurality of images of biometric features (for example, fingertips and fingerprints) where the images are taken under different conditions while still showing the same finger. As the transformation is obtained using portions of the images that exhibit the same characteristic, a neural network can advantageously be used in this process as such neural networks can be trained to identify reoccurring patterns, thereby increasing the accuracy with which corresponding characteristics can be identified and properly transformed. Training data sets for training neural network to particular biometric features are commonly available.

It can be provided that the biometric feature is a fingerprint and the plurality of characteristics are minutiae or wherein the biometric feature is an iris and the characteristics are pigments in the iris.

As these biometric features are used for identifying users in nowadays identification systems (for example, for gaining access to a mobile device or logging into accounts such as banking accounts), the method can advantageously be used in nowadays identification systems.

Obtaining the first image and the second images can comprise using an optical sensor to obtain the first image and the second image. Such optical sensors, like cameras, are widely available in nowadays mobile devices like Smartphones.

In one embodiment, the computer-implemented method comprises using the combined image in an identification process identifying the user.

With this, comparably many characteristics of the biometric features are used for identifying the user which increases the accuracy with which the user can be identified or unallowed accesses can be determined.

Aspects of the present disclosure provide for a device comprising at least one processor and a memory comprising computer-executable instructions that, when executed by the processor, cause the device to execute a method according to any of the above embodiments is provided. The device can, for example, be a smartphone comprising an optical sensor for taking the first and second image, or it can be a server or other computing device on which the computer-implemented method is executed while this computing device is provided with the first and second image from a mobile device, like a smartphone or any other device by which the first and second image of the biometric features are taken.

FIG. 1 shows a schematic depiction of a first image 101 and a second image 102, that are combined to form a combined image 103 according to one embodiment of the present disclosure.

The first image 101 and the second image 102 comprise, among others, a biometric feature of a user. In the example shown, this biometric feature is a fingerprint 112 of a finger 111 (and correspondingly for the finger 121 and the fingerprint 122 for the second image 102). The biometric feature comprises one or more characteristics 114, 124. At least one or more characteristics may be minutia of the fingerprint or, for example, if the biometric feature is the iris of a user, pigments of the iris as these are suitable for uniquely identifying the user to which the respective biometric feature belongs.

The first image 101 and the second image 102 can be taken by an optical sensor of a computing device (not shown), for example, a camera or the like. The computing device with which the images 101 and 102 have been taken may, for example, be a smartphone or other mobile device, though the present disclosure is not limited in this respect. The first image and the second image are taken at different orientations of the finger relative to the optical sensor that took the image. This is only exemplary shown by the particular characteristic 113 (a minutia) that is shown in the first image 101, but is not visible in the second image 102, whereas in the second image 102, minutiae 123 are visible that have not been touched by the optical sensor when taking the first image. The first and second images, may, for example, be obtained by holding a finger in front of the camera. Due to slight changes in the relative alignment of the finger and the optical sensor, consecutive images like the first image 101 and the second image 102 can be taken where generally, one or more characteristics in the first image are not visible in the second image and vice versa.

For identification purposes, however, it is preferred that as many characteristics of the biometric feature as possible are available for identification so as to increase the identification accuracy. On the other hand, all biometric features may be preferably represented in a manner where their relative arrangement (like angulation, scaling or the like) correspond to a single "large" image being taken of the biometric feature where all characteristics are visible at once.

For example, a first image showing a first subset of characteristics taken under a first relative arrangement of the biometric feature and the optical sensor may not simply be placed alongside a second image that was taken under different conditions and shows different characteristics of the biometric features so as to determine, from all visible characteristics, the identity of the user. This may result in a misalignment of the characteristics of the biometric feature of the first image and the second image relative to each other that does not correspond to the position of the respective characteristics in the real biometric feature of the user, thereby leading to false identifications, particularly in cases where there are large deviations in the relative alignment of the biometric feature relative to the optical sensor when taking the first and the second image.

In order to avoid this, the computer-implemented method, according to the embodiments of the present disclosure, obtains, from the first image 101 and the second image 102, a combined image 103 where portions of the first image and portions of a modified second image are stitched together. This is achieved by modifying at least portions of the second image in a way so that the modified portion corresponds, with respect to the arrangement of the characteristic or biometric feature shown in the portion of the second image, to the position of the characteristic or biometric feature that would have been obtained if the second image were taken under the same conditions (relative arrangement of the biometric feature and optical sensor) as the first image 101.

The combined image 103 may, therefore, be made up from portions of the first image and portions obtained from modifying the second image, as denoted with 131 and 132. Particularly, the portions of the second image 132 that are modified and added to the first image or portion 131 of the first image, may be those that comprise characteristics 123 that have not been visible in the first image 101.

In total, the combined image does not only comprise those characteristics 114 and 124 of the biometric feature that are visible in both images, but also comprises the characteristics 113 that are only visible in the first image 101 and the characteristics 123 that are only visible in the second image 123. Thereby, the number of characteristics of biometric feature that are visible and properly aligned to each other in the combined image is preferably larger than the number of characteristics visible in either the first image or the second image, allowing for using more characteristics of the biometric feature, for, for example, identifying a user.

Figure 2:
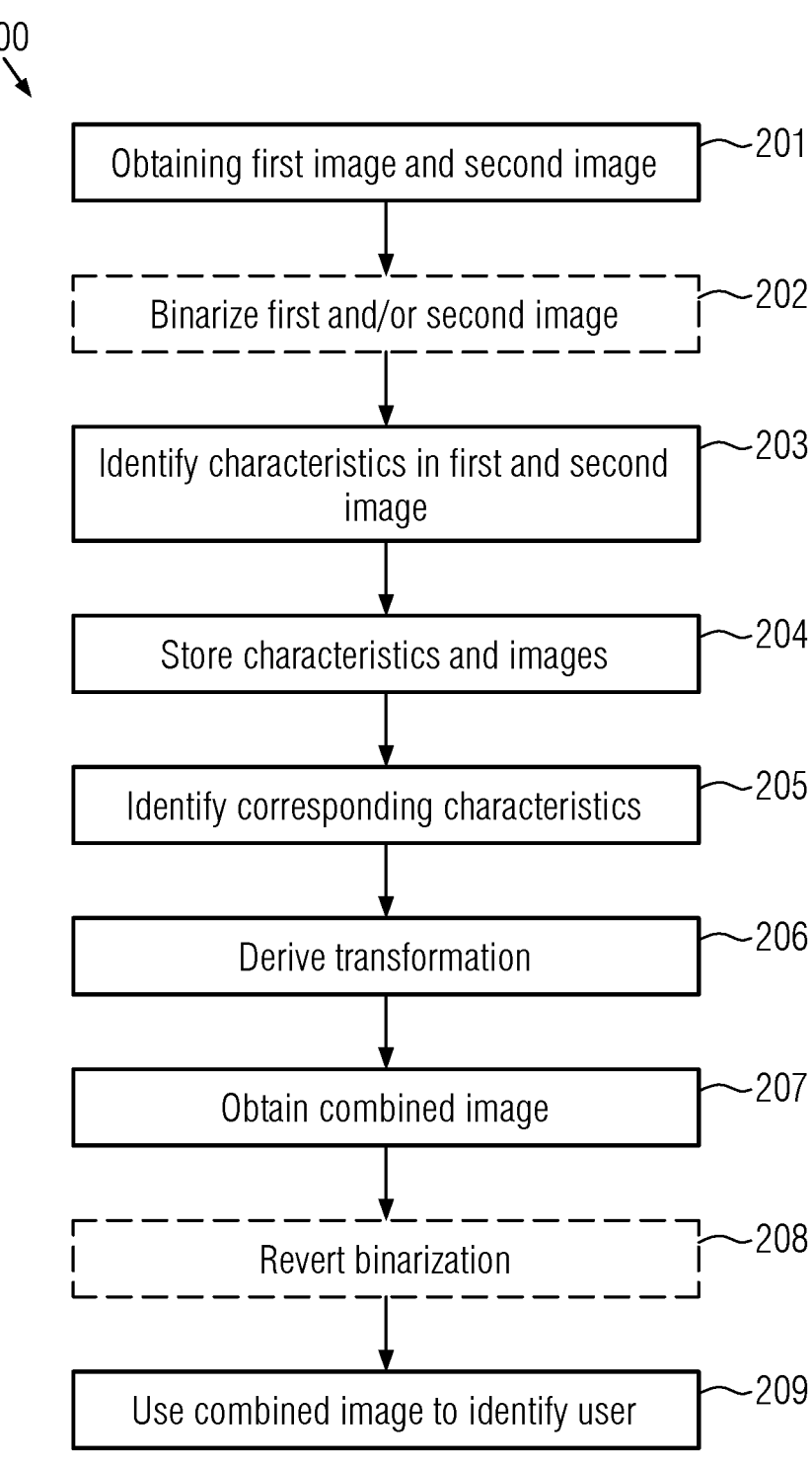
FIG. 2 shows a flow diagram of a computer-implemented method according to one embodiment of the present disclosure.

FIG. 2 shows a flow chart of a computer-implemented method that produced the combined image.

The computer-implemented method (in the following also referred to only as "method") 200 begins with obtaining of the first and second image (or at least a first image and a second image) in step 201. It is noted that the present disclosure is not limited with respect to how many images are combined to obtain the combined image, and the approach is generally the same. One image is taken as "central image" to which at least portions of at least one further image (in the example of FIG. 2, the second image)

are added after modification throughout the method 200. It can also be provided that more than two images (for example three or four or ten images) are combined to obtain the combined image. In cases where more than two images are used, there may nevertheless be provided a single "central image" and the methods discussed in the following are executed with respect to each further image relative to the basic image in isolation from or separate from how the other images are processed.

However, for explanatory purposes only, reference will be made in the following to two images being taken, and the first image will be assumed to be the central image or base image whereas the second image is modified and added to the first image at least portion wise.

A determination of whether the first image or the second image is the central image is not necessarily provided but can be envisaged. For example, the central image may be the image that carries most characteristics among all images used. This determination can be done as part of step 201 already or, for example, as part of step 203. In any case, this determination of which image is to be used as the central image should be made before a transformation (see description of step 206) is determined, as this includes the setting of the central image and comparing this central image with the second image (or other images) which is to be modified.

In the following, we will be assuming that the first image is the central image. In an optional step 202, the first and/or second image can be binarized (by setting only white and black values). This can be advantageous in order to more clearly identify the characteristics of the biometric feature in the first and second image. Particularly, it can be provided that both the first and the second images are binarized in the optional step 202. However, this is not mandatory and it may, for example, also be envisaged that only one of the first and second image is binarized in step 202 depending on, for example, the contrast of each image. For example, if the contrast is below a particular threshold, the respective image may be binarized in order to increase the contrast whereas, if the contrast of a particular image is already above a given threshold, no binarizing may be provided.

Subsequently (either after step 201 or, if provided, after step 202) the characteristics of the biometric feature in the first image and the second image are identified per image. This means that at least some, preferably all characteristics (like minutiae or ridges) that are visible in each of the first image and the second image are identified preferably with respect to their position in the image (for example, by determining the pixels making up the respective characteristic) or by providing a data structure that encodes the positions of the respective characteristics in each of the first and the second image.

Subsequently, the characteristics may be stored and additionally the images may be stored 204. The characteristics may be stored separately from the images or may be stored in the same data structure. It may also be provided that the images, which can be represented in the form of a matrix or the like, where each entry constitutes the position of the pixel it encodes and its respective color value, are combined with the identification of the characteristics in the first and second image. For example, if identifying the characteristics in the first and second image comprises creating a matrix where each pixel in the respective image is associated with a 0 or a 1, where a 0 is indicative of this pixel belonging to a biometric characteristic and 1 is indicative of the respective pixel not belonging to the characteristic (or vice versa), this matrix can be combined with the matrix making up the image itself by, for example, adding, to the entry in the respective matrix for each pixel, the value 0 or 1, depending on whether it belongs to the characteristic or not.

Irrespective of how the characteristics and the images are actually stored in step 204, characteristics that are present in both the first and the second image are identified in step 205. This may, for example, be done using a pattern matching algorithm and/or using a neural network for performing pattern recognition to identify, even though not aligned in the same way relative to the optical sensor in general, characteristics that are similar in both the first and the second image. This may comprise associating those pixels in the first image with those pixels in the second image that belong to the same characteristic though not positioned at the same position in the first and second image due to different orientation of the biometric feature relative to the optical sensor when the first and second image is taken.

Having identified at least one, preferably more corresponding characteristics in the first image and the second image, a transformation is derived in step 206. This transformation determines how the pixels in the second image have to be changed in order to transform the respective characteristic(s) exhibited in the second image in a manner that this modified or transformed arrangement corresponds to the relative arrangement of the characteristic(s) in the first image.

This may comprise, among others, a rotating and/or scaling and/or translational movement of portions of the second image (for example, pixels) and can be encoded in the transformation. The transformation may be represented in the form of a matrix that associates the necessary positional changes of pixels or portions of the second image and may comprise one or more values that may be indicative of the rotation and/or movement and and/or scaling that is necessary.

In step 207, the first image is combined with a modified second image or at least a modified portion of the second image that is obtained using the transformation derived in step 206. This modified second image or portions thereof are thus aligned with the first image and exhibit the characteristics in a manner that corresponds to an arrangement relative to the optical sensor that was used when taking the first image. With this, a combined image is obtained, where at least one portion belongs to the first image and at least one portion belongs to the modified portion of the second image.

It can particularly be provided that, if both the first and the second image comprise overlapping portions (i.e., in order to identify corresponding characteristics in step 205), that the portions of the first image are maintained and the corresponding portions of the second image are not used in order to create the combined image. Identifying such overlapping portions is at least partially already done when identifying matching characteristics in the first image and the second image (step 205). Information obtained in step 205 may thus be used to determine the portions of the second image that are to be discarded because portions of the first image are available.

Thus, the combined image may preferably be made up from portions of the first image even in case corresponding portions exist in the second image and only those portions of the second image that have been transformed but have not been visible in the first image.

It is noted that this comprises applying the transformation obtained in step 206 from portions that exist in both the first and the second image to at least one pixel and/or at least one portion in the second image that is not visible in the first image. This pre-requires that the transformation also holds for such pixels/portions though not calculated for them.

However, it has been found that the transformation derived indeed constitutes a reasonable approximation also for other portions of the second image. This can be explained using the insight that, if one portion of the second image is taken, for exemplary purposes, at a larger distance compared to the distance at which the first image was taken (the distance denoting the distance between the biometric feature and the optical sensor), then this change in the distance also exists for another portion of the biometric feature when taken the second image.

For example, if the first image is taken with one point of the finger being at a distance of 2 centimeters (cm) from the optical sensor and the second image is taken with the same point being at a distance of 5 cm from the optical sensor, then the distance of all other points of the finger to the optical sensors depends (e.g., depends only on) on the actual shape of the finger which does not change between taking the first image and the second image. If, for the first pixel and the corresponding pixel, a transformation is thus used that scales the respective pixel from a distance of 5 cm to a distance of 2 cm, then a corresponding transformation holds for all other pixels in the second image. This example is applicable in case no relative rotation of the biometric feature relative to the optical sensor takes place and no translational movements occur between taking the first and the second image. However, the principle is also applicable to such relative movements or combinations thereof.

Preferably, the combined image is created on a pixel-wise basis where those pixels of the second image that are not visible in the first image are modified and added to the first image so as to create the combined image. Preferably, obtaining the combined image is thus done in a manner that is void of any breaks between portions of the second image and portions of the first image, thereby increasing the quality of the combined image for identification purposes.

While a general transformation and a general obtaining of the transformation from the identified corresponding characteristics has been explained so far, there are different realizations possible. For example, for each identified characteristic and the corresponding identified characteristic in the first and the second image, a transformation that transforms the corresponding characteristic of the second image to the characteristic in the first image can be determined and the transformation can be obtained as a mean value of all transformations obtained.

While this results in a reliable transformation, particularly in cases where the number of disjointed pairs of identified characteristics in the first image and the corresponding identified characteristics in the second image is comparably large, there may still be outliers that are influencing the obtained transformation though not being reliable (for example, due to improper identification of characteristics as corresponding to each other while these characteristics do not correspond to each other).

Alternatively, it may be provided that for at least two disjointed pairs of an identified characteristic in the first image and the corresponding identified characteristic in the second image, a sub-transformation is obtained. This sub-transformation transforms the corresponding identified characteristic in the second image to the identified characteristic in the first image, i.e., matches them. Each such sub-transformation may, like the transformation, be a mathematical expression comprising of one or more values that determine how pixels of the corresponding identified characteristic in the second image have to be modified to be matched with those pixels of the identified characteristic in the first image.

The obtained sub-transformations may then be used to determine the transformation. This may comprise further processing of the sub-transformations either together or in isolation and may, for example, use a weighting algorithm where sub-transformations are weighted more if they are closer to the center of the image compared to sub-transformations that belong to characteristics that are further away from the center of the first and/or second image. This is because characteristics that are closer to the center of the image are usually taken with better quality, allowing for more reliable identification of the sub-transformation necessary.

For at least two sub-transformations, it may be provided that the transformation is obtained by calculating a global transformation from the at least two sub-transformations that may for example, be the mean value of all sub-transformations. Additionally, after having obtained this global transformation, a deviation for each sub-transformation from this global transformation may be determined as absolute or relative value. From this, at least one sub-transformation may be excluded depending on its deviation from the global transformation, particularly by determining whether the deviation is larger than a given threshold.

For example, assuming that the transformation solely consists in a movement, and the global transformation denotes a movement of 2 cm, and most of the sub-transformations denote a movement of 1.9 to 2.1 cm but a subset of sub-transformations denotes a larger movement like, for example, denoting a movement of 2.3 or 2.5 cm, the latter sub-transformations may be discarded. This may be done based on a fixed amount of sub-transformations being discarded, (for example, 10% of the sub-transformations originally used for calculating the global transformation and exhibiting the highest deviation) and/or this may encompass discarding sub-transformations that deviate from the global transformation obtained by a threshold value, which may be an absolute or relative value. The absolute or relative value may be based on the value of the global transformation or may be preset.

Having discarded the sub-transformations based on their deviation, the global transformation may be recalculated by using those sub-transformations that have not been discarded previously (e.g., by using only the maintained sub-transformations). This recalculated global transformation may then be used as transformation in step 206. Alternatively, it may also be provided that, if it is determined that a number of sub-transformations that is below a given threshold number would be discarded after having obtained the global transformation, the global transformation obtained in the first calculations based on all sub-transformations is maintained as transformation.

While the explanations given so far were performed on an optionally binarized first and/or second image, the method according to FIG. 2 may comprise reverting the binarizing either once the combined image has been obtained or before the combined image is obtained (step 208). In step 209 of FIG. 2, the combined image may then, for example, be forwarded to an identification means for identifying the user using the characteristics shown in the combined image.

In addition to obtaining the transformation by using identified characteristics in the first image and the second image, orientation similarities of particular pixels of the characteristics or regions (like characteristics) may be used. This is an approach that is not identical to the approach described so far and therefore has the advantage that the transformation values obtained with this approach may not suffer from the same systematic failures and, if used for deriving the transformation in step 206 in addition to the approaches described so far, can increase the reliability of the transformation.

Figure 3:
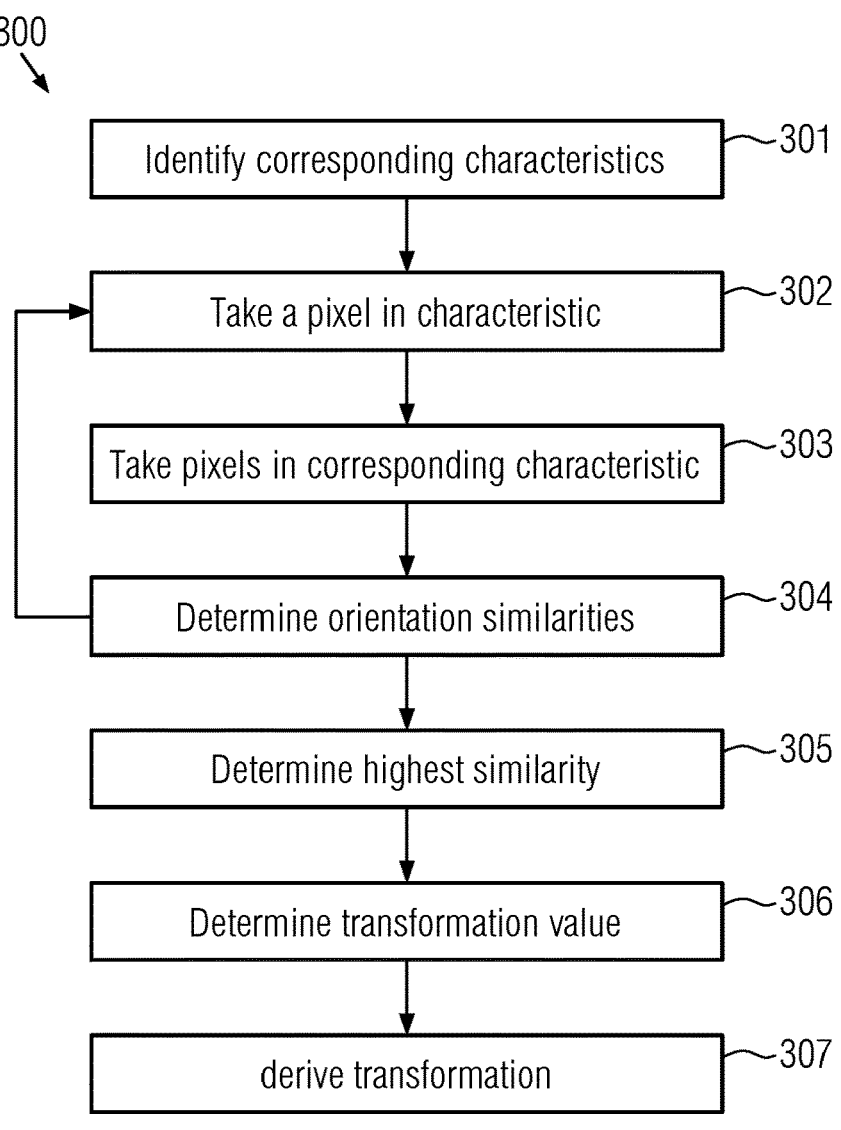
FIG. 3 shows a flow diagram of a computer-implemented method using orientation similarities, according to one embodiment of the present disclosure.

FIG. 3 shows a flow-diagram of a corresponding method 300, where the first step 301 comprises identifying corresponding characteristics in the first image and in the second image corresponding to step 203 of FIG. 2. Though not explicitly discussed here, the steps 201 and optionally 202 may be performed in advance.

In step 302, in the first image and in a particular characteristic in the first image, one pixel may be selected. Subsequently, in step 303, one or more pixels in the second image and in the characteristic corresponding to the characteristic used in step 302 may be taken that closely match the pixel in the characteristic of the first image selected in step 302.

For each of these pixels, orientation similarities relative to the pixel in the first image are determined in step 304. For example, the pixel constituting the beginning of a ridge present in the first image and in the second image may be compared for the first image and the second image and their orientation determined. From this, a similarity score (for example the inverse value of the difference of the orientation) can be taken as similarity value. This process can be repeated either for different pixels in the second image relative to one fixed pixel in the first image and/or this process can be repeated by using another pixel in the first image and determine orientation similarities of corresponding pixels in the second image.

Having determined a number of orientation similarities, it can be provided that a particular pair of pixels having a larger orientation similarity than other pixels and preferably having the highest orientation similarity among all pixels is determined in step 305, and this pair is used to determine a transformation value in step 306 that transforms the position of the respective pixel in the second image to the position of the first image. The determined transformation values can then be used to derive the transformation in step the 307 by, for example, combining it with the transformation obtained with any of the above embodiments.

Figure 4:
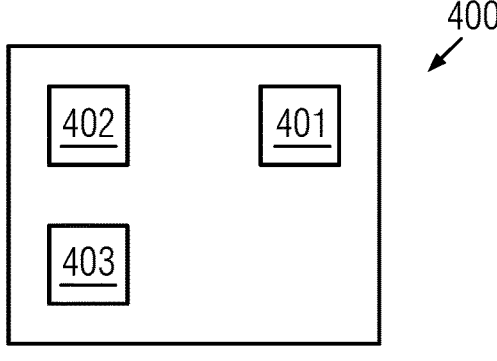
FIG. 4 shows a schematic depiction of a device according to one embodiment of the present disclosure.

FIG. 4 exemplarily depicts a device 400 that can be used for carrying out the method according to any of the above-described embodiments. The device 400 comprises of at least a processor 401 and associated memory 402. The associated memory 402 may also be remote to the device 400 comprising the processor 401 but in any case a connection between the processor and the memory is provided that allows for obtaining instructions from the associated memory 402 to carry out a method according to any of the above embodiments. Additionally, the device 400 may comprise an optical sensor 403 like a camera for obtaining the first and second image. However, this is not mandatory and, as explained above, the device carrying out the method according to any of the above embodiments not necessarily is the same device that takes the first and second image. Rather, the first and second image may also be provided from another device via a collection for data transfer (wired or wireless).

It is to be understood that the above description is intended to be illustrative, and not restrictive. Other embodiments will be apparent upon reading and understanding the above description. Although embodiments of the present disclosure have been described with reference to specific example embodiments, it will be recognized that the present disclosure is not limited to the embodiments described, but can be practiced with modification and alteration within the spirit and scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A computer-implemented method for obtaining a combined image from two images, the computer-implemented method comprising:

obtaining a first image and a second image of a biometric feature of a user, the biometric feature comprising a plurality of characteristics;

identifying, in the first image and in the second image, the plurality of characteristics;

storing the first and second image and the identified plurality of the characteristics;

identifying, for at least some of the identified plurality of the characteristics in the first image, a corresponding identified plurality of the characteristics in the second image;

deriving a transformation for transforming the at least some of the identified plurality of the characteristics in the second image into the corresponding identified plurality of the characteristics in the first image, wherein deriving the transformation comprises using a neural network to determine at least one value characterizing the transformation;

modifying at least a portion of the second image using the transformation; and obtaining the combined image comprising at least one portion of the first image and the at least one modified portion of the second image.

2. The computer-implemented method of claim 1, wherein obtaining the first and the second image comprises binarizing a first original image and a second original image.

3. The computer-implemented method of claim 1, wherein deriving the transformation comprises:

obtaining for at least two disjointed pairs of an identified characteristic in the first image and the corresponding identified characteristic in the second image, a subtransformation; and obtaining, from at least two sub-transformations, the transformation.

4. The computer-implemented method of claim 3, wherein obtaining, from the at least two sub-transformations, the transformation, comprises:

calculating a global transformation from the at least two sub-transformations;

determining, for at least one sub-transformation, a deviation from the global transformation; and determining, depending on the deviation, whether to discard or maintain the at least one sub-transformation.

5. The computer-implemented method of claim 4, further comprising:

recalculating the global transformation using only maintained sub-transformations; and using the recalculated global transformation as the transformation.

6. The computer-implemented method of claim 1, wherein the transformation is indicative of at least one of an amount of scaling, moving, or rotating to transform the portion of the second image.

7. The computer-implemented method of claim 1, wherein obtaining the combined image comprises:

modifying each portion of the second image using the transformation to generate a modified second image; and using, for at least one portion existing in the first image and the modified second image, the at least one portion existing in the first image.

8. The computer-implemented method of claim 1, wherein deriving the transformation further comprises:
obtaining, from the first and the second image, an orientation map; and
using the orientation map for deriving the transformation.

9. The method of claim 8, wherein obtaining the orientation map comprises:
identifying, for at least one characteristic in the first image and a corresponding characteristic in the second image, a pixel in the at least one characteristic in the first image and a corresponding pixel in the corresponding characteristic in the second image for which a first orientation similarity is higher than a second orientation similarity for at least one other pixel in the at least one characteristic in the first image and a corresponding other pixel in the corresponding characteristic in the second image; and
providing orientation information on the pixel in the orientation map.

10. The computer-implemented method of claim 9, wherein the first orientation similarity of the pixel and the corresponding pixel is a highest orientation similarity of all pixels in the at least one characteristic and the corresponding characteristic.

11. The computer-implemented method of claim 1, wherein the biometric feature comprise at least one of a fingerprint or an iris, and wherein the plurality of characteristics comprise at least one of minutia of the fingerprint or pigments in the iris.

12. The computer-implemented method of claim 1, wherein obtaining the first image and the second image comprises using an optical sensor to obtain the first image and the second image.

13. The computer-implemented method of claim 1, further comprising using the combined image in an identification process identifying the user.

14. A device comprising at least one processor and a memory comprising computer-executable instructions that, when executed by the at least one processor, cause the device to perform operations comprising:
obtaining a first image and a second image of a biometric feature of a user, the biometric feature comprising a plurality of characteristics;
identifying, in the first image and in the second image, the plurality of characteristics;
storing the first and second image and the identified plurality of the characteristics;
identifying, for at least some of the identified plurality of the characteristics in the first image, a corresponding identified plurality of the characteristics in the second image;
deriving a transformation for transforming the at least some of the identified plurality of the characteristics in the second image into the corresponding identified plurality of the characteristics in the first image, wherein deriving the transformation comprises using a neural network to determine at least one value characterizing the transformation;
modifying at least a portion of the second image using the transformation; and
obtaining a combined image comprising at least one portion of the first image and the at least one modified portion of the second image.

15. The device of claim 14, wherein deriving the transformation comprises:
obtaining for at least two disjointed pairs of an identified characteristic in the first image and the corresponding identified characteristic in the second image, a sub-transformation; and
obtaining, from at least two sub-transformations, the transformation.

16. The device of claim 15, wherein obtaining, from the at least two sub-transformations, the transformation, comprises:
calculating a global transformation from the at least two sub-transformations;
determining, for at least one sub-transformation, a deviation from the global transformation; and
determining, depending on the deviation, whether to discard or maintain the at least one sub-transformation.

17. The device of claim 14, wherein obtaining the combined image comprises:
modifying each portion of the second image using the transformation to generate a modified second image; and
using, for at least one portion existing in the first image and the modified second image, the at least one portion existing in the first image.

18. The device of claim 14, the operations further comprising:
obtaining, from the first and the second image, an orientation map by:
identifying, for at least one characteristic in the first image and a corresponding characteristic in the second image, a pixel in the at least one characteristic in the first image and a corresponding pixel in the corresponding characteristic in the second image for which a first orientation similarity is higher than a second orientation similarity for at least one other pixel in the at least one characteristic in the first image and a corresponding other pixel in the corresponding characteristic in the second image; and
providing orientation information on the pixel in the orientation map; and
using the orientation map for deriving the transformation.

19. The device of claim 16, the operations further comprising:
recalculating the global transformation using only maintained sub-transformations; and
using the recalculated global transformation as the transformation.

20. The device of claim 18, wherein the first orientation similarity of the pixel and the corresponding pixel is a highest orientation similarity of all pixels in the at least one characteristic and the corresponding characteristic.

* * * * *